(12) United States Patent
Campbell

(10) Patent No.: US 9,392,823 B2
(45) Date of Patent: Jul. 19, 2016

(54) ILLUMINATED GARMENT AND ACCESSORIES

(71) Applicant: LUMATIV INC., Los Angeles, CA (US)

(72) Inventor: Scott William Campbell, Los Angeles, CA (US)

(73) Assignee: Lumativ Inc., Los Angeles, CA (US)

( * ) Notice: Subject to any disclaimer, the term of this patent is extended or adjusted under 35 U.S.C. 154(b) by 0 days.

(21) Appl. No.: 15/005,346

(22) Filed: Jan. 25, 2016

(65) Prior Publication Data

US 2016/0135515 A1    May 19, 2016

Related U.S. Application Data

(63) Continuation of application No. 14/444,886, filed on Jul. 28, 2014, now Pat. No. 9,244,211.

(51) Int. Cl.
| | |
|---|---|
| A42B 1/24 | (2006.01) |
| A41D 1/00 | (2006.01) |
| F21V 8/00 | (2006.01) |
| F21V 33/00 | (2006.01) |
| A41F 9/00 | (2006.01) |
| A41D 3/00 | (2006.01) |
| A41D 1/06 | (2006.01) |
| A41B 1/08 | (2006.01) |
| A41D 23/00 | (2006.01) |
| F21Y 101/02 | (2006.01) |
| F21W 121/06 | (2006.01) |

(52) U.S. Cl.
CPC . *A41D 1/002* (2013.01); *A41B 1/08* (2013.01); *A41D 1/06* (2013.01); *A41D 3/00* (2013.01); *A41D 23/00* (2013.01); *A41F 9/002* (2013.01); *A42B 1/244* (2013.01); *F21V 33/0008* (2013.01); *G02B 6/006* (2013.01); *G02B 6/0051* (2013.01); *G02B 6/0073* (2013.01); *F21W 2121/06* (2013.01); *F21Y 2101/02* (2013.01)

(58) Field of Classification Search
CPC .... G02B 6/0051; G02B 6/0073; A42B 1/242; A42B 1/248; A42B 1/244; A41D 27/00
See application file for complete search history.

(56) References Cited

U.S. PATENT DOCUMENTS

| | | |
|---|---|---|
| 3,521,216 A | 7/1970 | Tolegian |
| 3,786,391 A | 1/1974 | Mathauser |
| 3,808,577 A | 4/1974 | Mathauser |
| 3,810,258 A | 5/1974 | Mathauser |
| 5,401,175 A | 3/1995 | Guimond et al. |
| 5,803,751 A | 9/1998 | Liu |
| 6,007,363 A | 12/1999 | Renk |
| 6,565,363 B2 | 5/2003 | Downing |
| 6,727,477 B1 | 4/2004 | Li-Chen |

(Continued)

*Primary Examiner* — Tracie Y Green
(74) *Attorney, Agent, or Firm* — Russo & Duckworth, LLP; David G. Duckworth

(57) ABSTRACT

An illuminated garment is provided including at least three panels including a flexible fabric back panel, a flexible fabric front panel, and a planar light panel. The flexible fabric back panel forms the interior of the garment to be positioned adjacent to a person's body. The flexible fabric front panel forms the exterior of the garment. The planar light panel produces light and is positioned between the back panel and front panel. Preferably, a blackout layer is positioned on the interior side of the front panel to be adjacent said light panel. The flexible fabric front panel includes one or more openings in the form of decorative designs which permit the passage of light from the planar light panel.

5 Claims, 4 Drawing Sheets

(56) References Cited

U.S. PATENT DOCUMENTS

| | | |
|---|---|---|
| 6,966,781 B1 | 11/2005 | Bullinger et al. |
| 7,264,479 B1 | 9/2007 | Lee |
| 7,625,213 B1 | 12/2009 | Tse |
| 7,637,746 B2 | 12/2009 | Lindberg et al. |
| 8,382,486 B2 | 2/2013 | Lee et al. |
| 8,398,409 B2 | 3/2013 | Schmidt |
| 8,602,795 B2 | 12/2013 | Hsu |
| 8,696,366 B2 | 4/2014 | Chen et al. |
| 9,112,303 B2 | 8/2015 | Zeliff et al. |
| 2004/0209489 A1 | 10/2004 | Clapper |
| 2013/0323941 A1 | 12/2013 | Zeliff et al. |
| 2014/0268684 A1* | 9/2014 | Waters ............ F21V 21/14 362/106 |

\* cited by examiner

ILLUMINATED GARMENT AND ACCESSORIES

RELATED APPLICATIONS

The present application is a continuation application of co-pending U.S. patent application Ser. No. 14/444,886 filed Jul. 28, 2014.

Many types of clothing articles and accessories may have displays, panels, signs, or stickers which are illuminated by electrical or electronic means. The decorative illumination of clothing involves incorporating discrete illumination sources, such as light bulbs or light emitting diodes, into hats or T-shirts. The light sources may be powered by a power source incorporated into the clothing.

One example of such clothing accessory in which light sources may be implemented is headwear. Hats and other headwear have become increasingly popular in recent years. In particular, casual baseball-cap style sporting hats are versatile, easily adjustable, and useful for protecting the wearer's eyes from sunlight or rain. Caps are commonly known attire worn on the heads of men, women and children. Such hats may be decorated with screen-printed or embroidered names, logos, or other information, and are similar in popularity to screen-printed T-shirts. For example, baseball-type caps with advertising material thereon may be handed out or sold by manufacturers or businesses as a very practical type of promotional material.

BRIEF DESCRIPTION OF THE DRAWINGS

Example implementations are described in the following detailed description and in reference to the drawings, in which.

DETAILED DESCRIPTION

Various implementations described herein are directed to illuminated garment and/or accessories. More specifically, and as described in greater detail below, various aspects of the present disclosure are directed to a manner by which a garment or accessory utilizes a light source that interacts and/or interfaces with one or more light transmitting mediums to illuminate one or more designs on the garment or the accessory.

One example implementation may be headwear. Aspects of the present disclosure described herein provide an even distribution of light on headwear. According to various aspects of the present disclosure, the approach described herein allows a wearer to be visible from distance and even allow to the user to perform tasks (e.g., find the lock on your car door) using the light. Moreover, aspects of the present disclosure described herein also allow the user to have custom illuminated designs on a headwear. Among other things, this allows the front panel of the headwear to act as a canvas for artwork and designs made with light. Further, this approach allows the user to wear the headwear like a hat during the day and with the light at night. Such aspects, among other things, provide flexibility and may prevent the user from having to buy separate headwear for daytime and nighttime.

Moreover, according to various aspects of the present disclosure, the approach described herein allows a manufacturer to more efficiently manufacture goods that incorporate illuminated technology.

In one example in accordance with the present disclosure, a system for manufacturing an article of clothing with a light source is provided. The system comprises a lighting unit assembly having a light source, a transfer packet assembly to package the light source in a transfer packet, and a product assembly to attach the light source into the article of clothing. The article of clothing may be any wearable item including headwear, backpack, jacket, pants, robe, scarf, shirt, belt, and/or alike.

Figure 1:
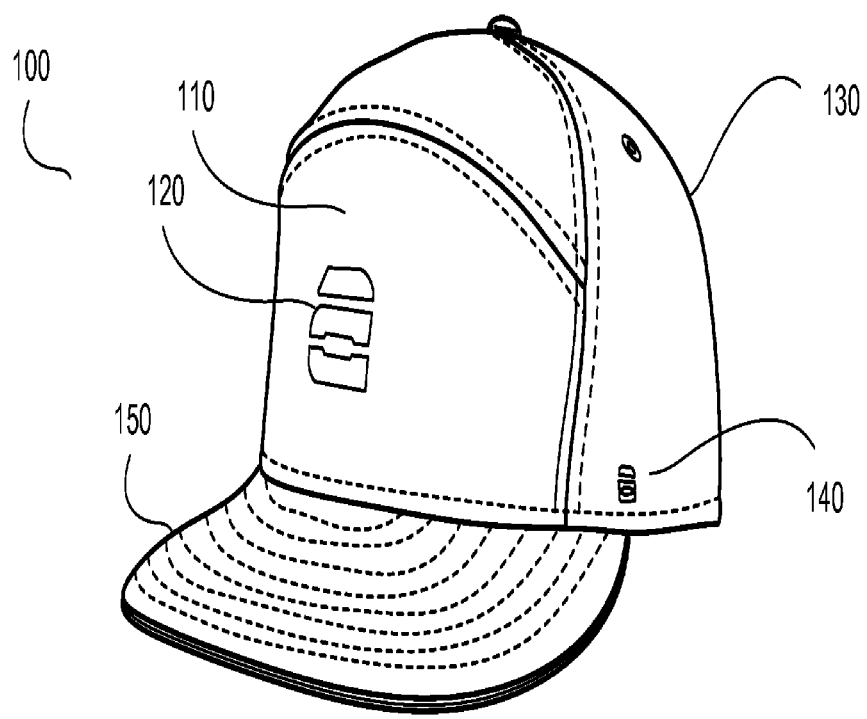
FIG. 1 illustrates a front view of example components of an example illuminated headwear in accordance with an implementation.

FIG. 1 illustrates example components of an illuminated headwear 100 in accordance with an implementation. The headwear 100 in FIG. 1 is a cap which incorporates an illumination system. It should be readily apparent that the headwear 100 illustrated in FIG. 1 represents a generalized depiction and that other components may be added or existing components may be removed, modified, or rearranged without departing from a scope of the present disclosure. The headwear 100 comprises a front panel 110, a logo 120, a head cover 130 and a switch 140, each of which is described in greater detail below. It should be readily apparent that while the headwear 100 illustrated in FIG. 1 includes one logo, the system may actually comprise a plurality of logos, and only one has been shown and described for simplicity.

The headwear 100 provides an upper section 130 that lays atop the head of the wearer. The upper section 130 may have one or more panels made from fabric, leather, plastic, GORE-TEX or other water resistant/proof materials, combinations thereof or other materials. Such panels may be sewn together, molded or produced to ultimately form the upper or semi-spherical dome shape of the headwear 100. In one example, the headwear 100 has six custom panels. Further, the upper section 130 may comprise a snapback closure. Such snapback closure provides a custom fit. The wearer may adjust the back as desired for a custom fit.

Further, the headwear 100 may have a bill or brim 150. The brim 150 may protrude orthogonally from the base of the upper section 130 and is affixed around substantially half of the circumference of the base of the upper section 130. The brim 150 may be made from a thin, flexible material such as cardboard, plastic, or the like, and may be covered by the same material from which the upper section 130 is made from. In one implementation, the brim 150 may have a slightly curved plane. The shape of the bend in the brim 150 may depend on the preference of the wearer.

The front panel 110 comprises a logo 120. The logo 120 may have custom illuminated designs and may be in any color. The front panel 110 uses lighting technology powered by a lightweight rechargeable electrical system that's fused within the headwear 100 itself.

As a part of the headwear 100, the electrical system may comprise a power chip that may be charged with any standard USB port. For example, the headwear 100 may be connected to a mobile device, a laptop, a personal computer, a car charger and/or alike. In one implementation, the USB port may be used along with a micro USB cable to plug the headwear 100 into a charger. A recharge port may be placed behind a sweatband on the wearer's right side. In another implementation, the power chip may charge in about thirty minutes and may illuminate the headwear 100 for 9-30 hours. Further, in one implementation, the illuminated designs of the headwear may light one color (e.g., red) when charging until fully charged. The illuminated designs of the headwear may illuminate in a different color (e.g., green) when finished charging.

The headwear 100 may have a switch 140 that may be used to turn the light on and off. In one implementation, the wearer of the headwear 100 may not need to remove the headwear 100 to turn the light on and off. The switch 140 may be located on the left side of the headwear 100. A tactile response of the switch 140 may allow the user to quickly turn the lighting on the headwear 100 on and off. A logo may be placed directly on the button to help the wearer locate the button quickly and easily.

The headwear 100 may have a battery. In one implementation, the battery may be a lithium polymer battery 130 mAh and 20×3×37 mm.

Figure 2:
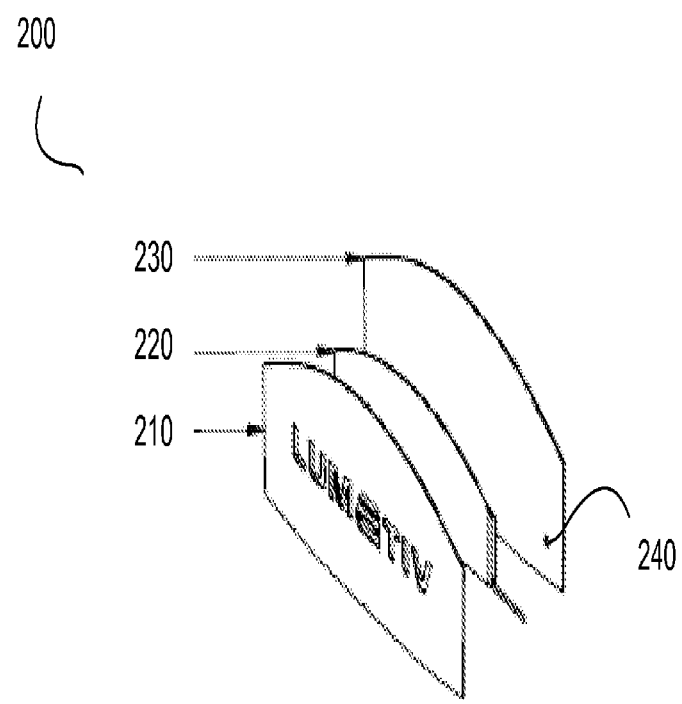
FIG. 2 illustrates example components of an example illuminated headwear in accordance with an implementation.

FIG. 2 illustrates example components of headwear 100 in accordance with an implementation. It should be readily apparent that the system 200 illustrated in FIG. 2 represents a generalized depiction and that other components may be added or existing components may be removed, modified, or rearranged without departing from a scope of the present disclosure. The front section 110 of the headwear 100 comprises a front panel 210, a light source 220 and a back panel 230.

The front panel 210 may be a window which allows for the light to be seen. This layer may be cut into a shape or design using various cutting techniques. Further, the outer material layer is fused with a blackout material layer using various adhesives. The blackout layer may be used to stop any excess light from permeating through the outer layer. The outer layer and blackout layer combine together to form the window layer (i.e., the front panel 210).

A layer of industrial strength adhesive may be applied over the blackout layer to have a uniform bond between the front panel 210 and the lighting assembly/source 220. The front panel 210 may then be cut using various methods such as laser or die cutting machine (depending on the material) to achieve a clean result. The light source 220 may then be adhered to the back of the window layer assembly (i.e., the front panel 210) and various heat or pressure applications may be utilized depending on the material and product.

In one implementation, a transfer packet assembly may be used to protect the lighting assembly 220. In one example, the lighting assembly may be delivered to a manufacturer of the headwear in such transfer packet assembly. Moreover, the transfer packet assembly may be used to accurately place the lighting source of the lighting assembly 220 into the headwear 100.

The back panel 230 may be a soft foam material with polyurethane coating on back side of the headwear 100. In one implementation, the foam may be 1.5 mm thick. Further, the back panel 230 comprises a hole 240. In one implementation, the hole 240 may be used for flex circuit to exit out from back of the panel 230.

Figure 3:
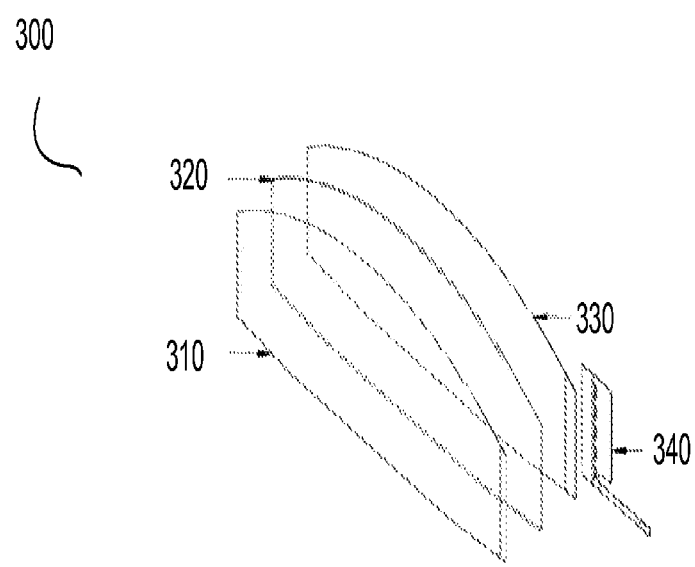
FIG. 3 illustrates example components of an example illuminated headwear in accordance with an implementation.

FIG. 3 illustrates a system 300 including example components of headwear 100 in accordance with an implementation. More specifically, the front section 110 of the headwear 100 comprises conductive thread adhesive circuits and printed flex circuitry, including a diffuser 310, a light panel 320, a reflector 330 and a LED Flex 340. It should be readily apparent that the system 300 illustrated in FIG. 3 represents a generalized depiction and that other components may be added or existing components may be removed, modified, or rearranged without departing from a scope of the present disclosure. For example, the system 300 comprises a fabric layer. The fabric layer is positioned behind the LED flex 340, which finishes the assembly of the front panel. The fabric layer is included for the comfort of a user of the headwear 100 and the aesthetics of the headwear 100. Moreover, the system 300 comprises an adhesive foam layer that is positioned between the fabric layer and the other layers as discussed above. The adhesive foam is used to seal at least one component of the headwear 100 from any moisture and protect the headwear 100 from damage.

The diffuser 310 may be frosted clear and 0.05" thick. The diffuser 310 may comprise an optically clear adhesive strip on the back side of the diffuser 310. The back strip adheres to the edges of the light panel. Further, the diffuser 310 may have optically clear adhesive strip on the front side of the diffuser 310. The front strip adheres to the LEO flex assembly.

In one implementation, the light panel 320 may have the same dimensions as the diffuser 310. The light panel 320 may comprise embedded optics system. In one implementation, the light panel 320 may be 1 mm thick and made from polyurethane.

The reflector 330 may be white and 0.075" thick. The reflector 330 may be attached with adhesive to the light panel 320 to allow for slight curving. The reflector 330 comprises at least one light source placed on one end of the reflector 330. For example, the light sources may be red, green and blue light emitting diodes ("LEDs") situated side by side, in no particular order. The illuminated light sources (LEDs) may transmit, refract, reflect, amplify, disperse, or radiate the visibility of light emitted by the different colored LEDs. As such, the illumination system may be configured to illuminate in various different colors (e.g., the red, green and blue LEDs) at various intermittent frequencies such that the combinations of different amplitudes and wavelengths of light generate a broad array of colors of light across the color spectrum. In one implementation, the reflector 330 may contain six LEDs and these LED may be spaced 6.5 mm or ¼ inches apart. In another implementation, the LEDs may be motion activated and may have three different motion activated effect modes. The modes may be three color strobe, 2 color strobe or 3 color fade. Such implementation comprises a pulse width modulation control. Further, in another implementation, the LEDs' color and brightness may be adjustable.

In one implementation, the reflector 330 may have the same shape and dimensions as the diffuser 310 and the light panel 320. The reflector 330 may have optically clear adhesive strip on the front and back side of the reflector 330. The strips adhere the reflector 330 to the light panel 320 edge and adhere the LED Flex 340 to the back of the reflector 330. In one implementation, the adhesive may be a double sided adhesive tape.

The LED Flex 340 is a custom designed flex circuit and may comprise four circuits. In one implementation, the LED Flex 340 comprises five RGB right angle LEDs. In one implementation, the LEDs run in series on a plurality of circuits. For example, the system may have four circuits.

Figure 4:
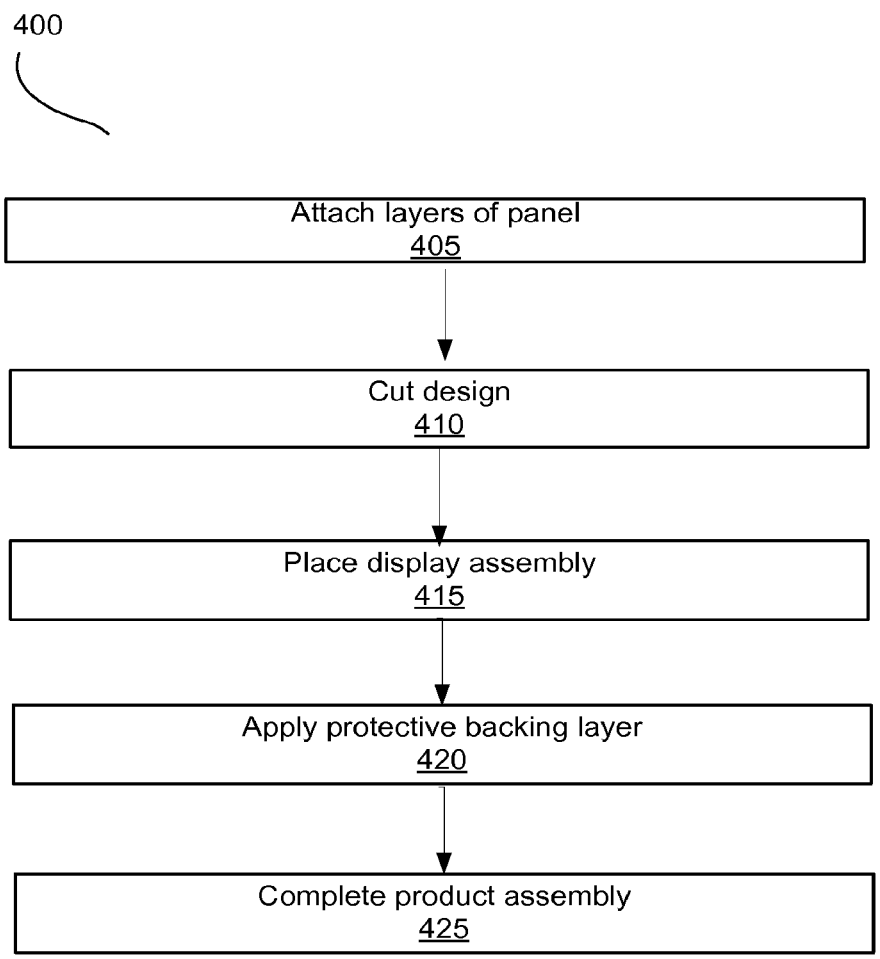
FIG. 4 illustrates an example process flow diagram in accordance with an implementation.

Turning now to the assembly process of the headwear 100, FIG. 4 illustrates an example process flow diagram 400 in accordance with an implementation. It should be readily apparent that the processes illustrated in FIG. 4 represents generalized illustrations, and that other processes may be added or existing processes may be removed, modified, or rearranged without departing from the scope and spirit of the present disclosure. The method 400 of implementation is used in order to attach the light source accurately into the headwear. It should be noted that the method 400 may also apply to other types of accessories or garment.

The process 400 may begin at block 405, where an outer material layer of a panel is applied with a blackout material layer. This process may also involve applying various adhesives to the front panel. In particular, such adhesives may be applied via heat or pressure. In one implementation, the blackout layer may be used to stop any excess light from permeating through the outer layer. In particular, this process may involve assembling approved polyester fabric with blackout layer and adhesive. Moreover, the assembly may need to rest for twelve to twenty-four hours to allow the adhesive to set into the fabric.

At block 410, the front panel may be cut to implement a design or an artwork. Various methods such as laser or die cutting machine (depending on the material) may be used. At block 415, the lighting unit may be placed on the back of the panel. In particular, this process may involve applying gentle pressure to ensure a strong bond between layers. In one implementation, the lighting unit may also be referred to it as a display assembly. For example, the lighting unit may be configured to function like a TV display. In another implementation, the lighting units may be received in transfer packets, which provide protection to various components of the unit.

At block 420, protective foam is applied to the rear surface of the panel. The protective foam prevents the moisture to go through. Accordingly, the protective foam protects the electronics of the lighting unit from, for example, sweat or other surface contacts. The type of material used as the protective foam may vary depending on the implementation. For example, the protective foam may be polyurethane. In another example, the protective layer may be a rubbery type material, which is configured to act like a paper barrier. Such protective layer may also be called a backing protective layer. In one implementation, the thickness of the foam may be 1.5 mm.

At block 425, the product assembly is completed. More specifically, this process may involve implementing assembled panel into the product.

The present disclosure has been shown and described with reference to the foregoing exemplary implementations. It is to be understood, however, that other forms, details, and examples may be made without departing from the spirit and scope of the disclosure that is defined in the following claims. As such, all examples are deemed to be non-limiting throughout this disclosure.

The invention claimed is:

1. An illuminated garment comprising:
   a flexible fabric back panel forming the interior of said garment to be positioned adjacent to a person's body;
   a flexible fabric front panel forming the exterior of said garment;
   a planar light panel producing light positioned between said back panel and said front panel;
   a blackout layer positioned on the interior side of said front panel to be adjacent said light panel; and
   said flexible fabric front panel including one or more openings in the form of decorative designs which permit the passage of light, said planar light panel positioned between said back panel and said front panel adjacent to said front panel's one or more openings to emit light through said one or more openings to produce illuminated decorative designs.

2. The illuminated garment of claim 1 wherein said light panel includes an interior positioned reflective layer, an exterior diffuser layer, an intermediate light layer and one or more LEDs mounted to the light layer, said LEDs emitting light through light layer to project light through said diffuser layer.

3. The illuminated garment of claim 1 wherein said garment includes a single planar light panel and said flexible fabric front panel includes two or more openings, and wherein said single planar light panel's periphery extends to beyond the edge of said two or more openings to emit light from said two or more openings.

4. The illuminated garment of claim 1 is a cap having a hollow semi-spherical shape for receiving the top of a person's head, the cap including a front section forming the front of the cap, and said front section including said flexible fabric back panel forming the interior of said cap's front section for engaging a person's head, and said flexible fabric front panel forming the exterior of said cap's front section.

5. The illuminated garment of claim 1 is selected from the group consisting of headwear, jacket, pants, robe, scarf, belt, shirt and backpack.

* * * * *